Dec. 21, 1965   R. G. HOLMAN   3,224,690
MACHINE FOR WINDING A BALL
Filed April 15, 1963   9 Sheets-Sheet 1

FIG. 1.

INVENTOR.
RUDOLPH G. HOLMAN
BY Nicholas T. Vohn
ATTORNEY.

Dec. 21, 1965   R. G. HOLMAN   3,224,690
MACHINE FOR WINDING A BALL
Filed April 15, 1963   9 Sheets-Sheet 3

INVENTOR.
RUDOLPH G. HOLMAN
BY
Nicholas T Volk
ATTORNEY.

INVENTOR.
RUDOLPH G. HOLMAN
BY
Nicholas T Volm
ATTORNEY.

Dec. 21, 1965   R. G. HOLMAN   3,224,690
MACHINE FOR WINDING A BALL
Filed April 15, 1963   9 Sheets-Sheet 5

INVENTOR.
RUDOLPH G. HOLMAN
BY
Nicholas T. Vohr
ATTORNEY.

Dec. 21, 1965  R. G. HOLMAN  3,224,690
MACHINE FOR WINDING A BALL
Filed April 15, 1963  9 Sheets-Sheet 6

*Fig. 9.*

INVENTOR.
RUDOLPH G. HOLMAN
BY
ATTORNEY.

Dec. 21, 1965  R. G. HOLMAN  3,224,690
MACHINE FOR WINDING A BALL
Filed April 15, 1963  9 Sheets-Sheet 8

INVENTOR.
Rudolph G. Holman
BY
Nicholas T Vohac
ATTORNEY.

Dec. 21, 1965   R. G. HOLMAN   3,224,690
MACHINE FOR WINDING A BALL
Filed April 15, 1963   9 Sheets-Sheet 9

INVENTOR.
RUDOLPH G. HOLMAN
BY
ATTORNEY.

United States Patent Office 3,224,690
Patented Dec. 21, 1965

3,224,690
MACHINE FOR WINDING A BALL
Rudolph G. Holman, 2301 Ponderosa, Apt. 8A,
Santa Ana, Calif.
Filed Apr. 15, 1963, Ser. No. 275,179
15 Claims. (Cl. 242—3)

This application for patent is a continuation-in-part of application S.N. 765,547, filed October 6, 1958, entitled A Machine for Winding a Ball (now abandoned) and application S.N. 43,957, filed July 19, 1961, entitled A Machine for Winding a Ball (now abandoned).

This invention relates to an apparatus for applying a winding to a ball. The invention is applicable to produce such game balls as volley balls, basketballs, baseballs, etc., and also commercial balls which are used as floats, buoys, fish-net balls and other spherical articles requiring a reinforcing winding or a carcass made of fine string or thread or wire.

The thread windings, or a "winding," as it will be called in this specification (the completed layer of wound thread) fixes the size of a ball and provides a very strong flexible layer on the ball which can resist pressure of air pumped into the ball. Such pressure may be in the order of 30 pounds per square inch and such pressure requires a very strong winding. It is not difficult to specify the parameters of an ideal winding—it should be light, strong, thin and as smooth as possible, and also have good dynamic characteristics.

The windings of the prior art constitute a very poor approximation of this ideal goal and it is the principal object of this invention to approach the ideal much closer than the prior art. For example, the weight of the disclosed winding is between 200%–400% lighter than the windings of the prior art, and its tensile strength, as measured by the burst pressure, is approximately from 200%–1,000% (greater) than the strength of balls using a cotton yarn for its winding. Moreover, the balls wound with cotton yarn suffer from excessive weight, poor shape of the winding, poor external smoothness, excessive thickness of the winding, poor dynamic characteristics and, finally, such windings are more expensive than those produced in accordance with the teachings of this invention.

Other prior art ball windings use a relatively thick nylon cord, which is used for imparting strength to the winding, and combining this cord with a staple yarn. Yarn is used in such a case primarily for enabling one to apply effectively the nylon cord which, being slippery, can be held on the surface of the ball effectively only when it is combined with the staple yarn. Balls of this type have the following disadvantages: The winding is thicker than necessary for achieving the desired strength; it is very poorly distributed over the ball's surface; its weight is excessive, and, therefore, from the point of view of weight, it is in the same category as the plain cotton winding. It also suffers, as does the 100% cotton winding, from poor stress distribution throughout the thickness of the winding, the inner layers being stressed more than the outer layers of the winding, and the balls have poor dynamic characteristics, i.e., they have very poor bounce.

It should be mentioned here also that prior art includes reinforcing membranes made of a fabric material which has an excessive weight, poor dynamic characteristics, high cost because of manual labor and large waste of the fabric material in the course of making the reinforcing membrane, and many other disadvantages.

All of the above windings, i.e., 100% cotton, nylon-and-yarn, and fabric membranes all have poor flexibility characteristics. One of the factors of prime importance for achieving the ideal winding is to have a substantially uniform distribution of the windings over the spherical periphery of the ball with the windings extending in all directions. It is especially important to avoid contour irregularities arising from local concentrations of overlaps of the wound material. It is also structurally important to have the individual turns approach as closely as possible great circles; however, since the windings are necessarily serially interconnected, consequently, continual change in winding direction is necessary for acceptable distribution of the individual turns.

The usual approach to the problem of winding a ball, insofar as the prior art is concerned, is to avoid close control of the individual turns and simply to seek random distribution. Such close control as would produce a recognizable predetermined winding pattern is not obtainable with the known machines.

The heretofore prevalent procedure for winding a ball, for example, a soft baseball, is to rest the ball structure in a freely rotatable manner on two closely adjacent parallel cylindrical rolls and to rotate the two rolls in the same rotary direction while simultaneously reciprocating the two rolls longitudinally along their axes in opposite directions. The result is far from such control as would produce an ascertainable winding pattern in which identical winding cycles are continually repeated and in which a definite predetermined relationship between the successive cycles may be detected simply by inspecting a finished ball.

A serious disadvantage of this prior art method, moreover, is that adequately random distribution of the windings requires relatively drastic reciprocation of the two rolls for continually drastic bias of the individual windings away from ideal great circle windings. Thus, the individual windings of the finished ball are typically wide departures from great circles rather than approximations of great circles and great circle turns are approached only infrequently when the two rollers pause at the limits of their range of reciprocation.

The broad object of the present invention is to provide a machine for makingg a wound ball with a winding having a controlled pattern producing a recognizable and accurately predetermined winding that results in efficient use of the winding material and obtains a very strong and yet thin, flexible and light winding having a very uniform thickness throughout the periphery of the ball, very smooth outer surface, and excellent dynamic characteristics. The basic winding pattern may be readily detected in a finished ball since it comprises relatively short, accurately predetermined, winding cycles which, in the case of the basic pattern, are exactly identical to each other and are successively shifted over the spherical area of the ball in an accurately predetermined manner. Efficiency in the use of a winding material is obtained, first, in the sense of achieving complete, uniform and exceptionally smooth coverage of the entire ball surface with minimum yardage of very fine thread and cord, and second, in the sense of closely approaching great circles in the individual turn, thus enhancing the individual strength of each turn and its ability to make a maximum contribution to the optimum dynamic characteristics of the finished product.

The disclosed apparatus for applying the winding to a ball is an electronically and mechanically controlled apparatus, in which the electronic elements control the operation of the mechanical components of the ball-winding machine. Briefly stated, a program cycle is the cycle which has a double rotation period, or a double rotation time interval, and the single rotation period, during which the thread follows the path of a great circle, or small circle, the two time periods constituting the program cycle. The double rotation means that there are first and second simultaneous rotations of the ball during the first period.

The first rotation is the continuous, uninterrupted constant speed rotation of the ball around a first fixed in space axis passing through the center of the ball, lying in a horizontal plane in the illustrated machine, and being parallel to the longitudinal axis of the machine. The second rotation is the rotation of the ball around a second axis passing through the center of the ball and being perpendicular to the first axis. The second rotation is synchronized with the first rotation to produce a continuous advancement of the cord in the same direction around the surface of the ball, with the turns passing throguh two poles or polar regions. The second rotation is a start-stop rotation, and when it stops, the ball is rotated only around the first horizontal axis thus winding the cord around a great circle or a small circle, depending on the position of the oscillating rollers which are used for producing the second rotation. The second rotation is stopped during the so-called single rotation period which lasts long enough to rotate the ball around the first axis through an angle which may be any angle from, say, 10° to 120°–170°; it is 120° in the example illustrated in the drawings. The period of time when the two rotations takes place will be referred to as the double rotation period and also as a wind period. The duration of the double rotation period determines the number of complete turns produced during a single program cycle. The speed of rotation of the ball around an axis passing through two poles determines the position of the individual 360° turns on the outer surface of the ball, and the position of the turns with respect to each other during each double rotation period. The angular spacing between the group of turns of successive cycles with respect to each other on the ball's surface, is determined by the duration of the single rotation period.

Each of the successive double rotation periods within the program cycles comprises a group of turns which may be compared with, and which resemble, a series of intersecting great circles, or meridian lines of longitude passing through north and south poles on a globe representing the earth. Thus, the successive individual turns produced during the double rotation period intersect in two diametrically opposite polar regions of the globe. The difference between the meridian lines and the turns resides in that the meridians are great circles closed upon themselves, each meridian lying in a single plane passing through two poles. The continuous cord turns represent a continuous cord winding in which the individual turns lie in a plurality of planes. The transition from one wind period to another is accomplished simply by continuing the final, last turn of a preceding double rotation period along a true great circle, or a small circle, for a predetermined fraction of a turn during the single rotation period of each program cycle and then repeating the original double rotation period with the ensuing successive turns intersecting at a new pair of polar regions. The new pair of polar regions is displaced from the preceding pair by a predetermined arc, or a length of arc measured in degrees, and also in a predetermined direction, as determined by the duration of the single rotation period within each program cycle.

It is, therefore, an object of this invention to provide an electro-mechanically controlled ball winding machine which is capable of producing a winding on a ball having a predetermined controllable pattern and consisting of a continuous, repeated group of turns, the turns in each group intersecting each other at two poles and each group being spaced from the succeeding group by an arc.

It is an additional object of this invention to provide a machine for producing a winding of the above type in which the parameters of the program cycle producing the group of turns and of the complete cycle, including a plurality of groups, may be varied in a predetermined, predictable manner.

It is also an object of this invention to provide a control system for a ball winding machine of the above type.

The winding produced with the aid of the disclosed machines satisfies many desired requirements, such as finite thickness, flexibility, bursting pressure, weight, uniformity of stress-strain characteristics throughout the spherical configuration of the winding and its thickness, dynamic characteristics of a ball when such winding is used for making play balls, and a number of other features which must be satisfied by the windings of the above type, including reasonable cost, smooth outer surface, uniform distribution of individual turns throughout the winding, and as close an approximation of great circles as possible by the individual turns, so long as such approximation constitutes a practicable compromise with the optimum solution of the requirements imposed by the numerous other winding parameters.

The novel features which are believed to be characteristic of the invention, both as to its organization and method of operation, together with further objects and advantages thereof, will be better understood from the following description taken in connection with the accompanying drawings in which several embodiments of the invention are illustrated as examples of the invention. It is to be expressly understood, however, that the drawings are for the purpose of illustration and description only, and are not intended as a definition of the elements of the invention.

Referring to the drawings:

FIG. 8–A is a plan view of the distribution of turns in a typical program cycle, and especially the type of polar region which may be employed with the invention;

FIGS. 8–B and 8–C are additional plan views of two additional types of distributions of turns in two respective program cycles;

Figure 1:
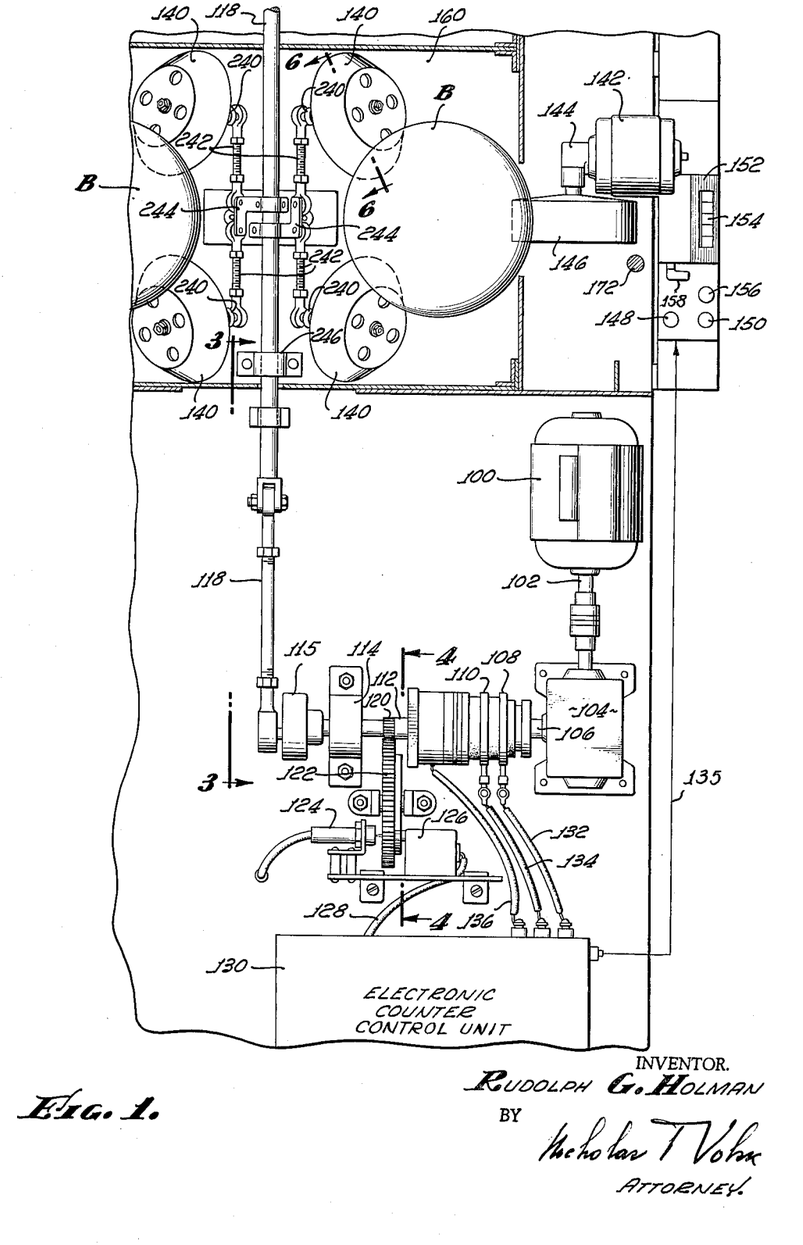
FIG. 1 is a plan view of the drive mechanism for a reciprocating rod including the driving motor, electronically controlled clutch and brake, a revolutions pulse generator, a cam connected to the reciprocating rod, and a winding station.

With reference now to the figures in which like parts are identified by the same reference numerals, there may be seen in FIG. 1 a synchronous motor 100 which is connected by a power cable (not shown) to a source of electrical power such as a 60-cycle A.C. power line. The output of the motor is applied to a connecting shaft 102 into a gear box 104. The gear box 104 has an output shaft 106 which is connected to an electrically actuated clutch 108 and brake 110. A drive shaft 112 is connected to a brake-clutch combination and is mounted in a bearing 114. The drive shaft 112 terminates in an eccentric cam and follower arrangement 115 which imparts reciprocating motion to a control rod 118.

A pinion gear 120 is concentrically mounted on the drive shaft 112 between the brake-clutch combination and the bearing 114. A toothed disc 122 is mounted adjacent to and is driven by the pinion 120 and is used to provide a revolution count. Mounted on one side of disc 122 is a light source 124, and a photo-electric detector 126 is placed on the other side of disc 122. One or more apertures are provided in disc 122 to complete a light path between the light source 124 and detector 126. As may be seen, the provision of a single aperture enables the generation of a single output pulse from the detector 126 for each revolution of disc 122. A plurality of apertures, therefore, enables the generation of a corresponding number of output pulses for each complete revolution of disc 122. A disc having a plurality of apertures is illustrated in FIG. 4-A. The apertures 400 may be spaced uniformly around the periphery of disc 401 in which case the angles "a" through "j" are equal. It is also possible to space these apertures unequally, as shown in FIG. 4-A, to obtain an unequal number of turns in different wind periods. This will be described more in detail later.

An electrical conductor 128 applies pulses from photo cell 126 to a counter control unit 130 which is mounted adjacent to the photo cell detector 126. A pair of output terminals on counter control unit 130 is connected through a pair of conductors 132, 134 to clutch 108 and brake 110, respectively. A third conductor 136 connects the brake-clutch combination to a source of common reference potential within the counter control unit 130.

The counter control unit 130, in response to the pulses from the photo cell detector 126, applies an enabling output signal either on conductor 132 or 134 alternately to energize the clutch and brake to start and stop reciprocation of rod 118 which controls the winding pattern on a ball. The counter control unit 130, to be described below, in response to one accumulation of pulses from the photo cell detector 126, de-energizes clutch 108 and energizes brake 110, stopping the rotation of shaft 112. After a preset time interval, brake 110 is released and clutch 108 is again actuated and shaft 112 resumes its rotation. The counter control unit 130 also applies the number of turns pulses from a number of turns pulse generator (described below) on conductor 135.

The reciprocating rod 118 is mechanically coupled to ball-supporting beveled rollers 140 in a manner to be more fully described in connection with FIG. 2 below.

Only a portion of a large ball winding machine is shown in FIG. 1. Part of the mechanism for winding two balls, B, is shown and it may be readily understood that additional ball winding stations, adjacent to the two shown, can be provided. The pair of beveled rollers 140 at each winding station are positioned relatively close together with their beveled surfaces being tangential to the ball B. Each winding station is provided with an individual synchronous motor 142 which is coupled through a gear box 144 to a drive roller 146. Drive roller 146 rotates ball B.

Motor 142 is operated by means of a manually operated start switch 148 and a manually operated stop switch 150. Motor 142 may also be stopped automatically by the output of a counter 152 that is coupled by conductor 135 to a source of timing pulses within the counter control unit 130. A dial 154 is provided to give a visual indication of the number of timing pulses received at each counter 152 for the guidance of the operators of the machine.

At the predetermined number of counts, motor 142 is automatically turned off and the winding process of that particularly ball is stopped. An operator may then remove the wound ball B and insert a new ball, having no winding, in its place. After manually fixing a filamentary material to the ball by manually winding several turns, a timer restart switch 156 is actuated and the new ball is wound in accordance with the program then in operation. The mechanical counter 152 is then reset by depressing a reset lever 158, and the entire cycle repeats itself as long as the machine is in operation.

As indicated above, in a multiple ball winding machine, the reciprocating rod 118 controls several individual ball winding units, each unit being considered as a single winding station capable of winding a single ball. As may be seen from FIG. 1, the winding stations are disposed in a back-to-back relationship and extend to encompass a number of back-to-back stations. Accordingly, there are two parallel rows of the stations, one row being in back-to-back relationship with respect to the second row. A side view of one such back-to-back station is illustrated in FIG. 2, with only one station being shown in full. Two rows of stations are mounted on an elevated platform or base plate 160. A suitable filamentary material such as a thread 162 is supplied from a large spool 164 mounted in the base of the machine. A tensioning device 166 applies a predetermined tension to the thread 162 prior to its being wound upon ball B. The thread 162 is led through a sleeve aperture 168 and is applied to the periphery of ball B, the aperture and the tensioning device acting as a thread feeding mechanism.

At each winding station, an atomizer, or spray head, 170 is adjustably mounted on an upright support 172. A separate spray head 170 is provided for each winding station and is connected to a compressed air supply pipe 174 and a liquid supply pipe 176, which are housed in a longitudinal channel 178 along each row of stations. Air from the supply pipe 174 is applied to each of the spray heads 170 through a flexible hose 180 which is controlled by a valve 182. A liquid cement from the liquid supply pipe 176 is fed to the spray head 170 through a hose 184 having a valve 186. A third hose 188 is connected to each spray head 170 for remote control of the operation of the gun by air pressure.

In one specific embodiment of the invention, the liquid supplied by pipe 176 and applied by spray gun 170 is a coumarone indene resin, but other liquid adhesives can be used in other embodiments of the invention. The two rows of winding stations are provided with an upright frame structure 189 mounted on the base plate 160. Frame 189 carries a central exhaust duct 190 for removing vapors released from spray head 170. Exhaust duct 190 has an intake port 192 at each winding station.

A pair of shafts 194 journalled in spaced bearings 196 is mounted on top of the frame structure 189. At each winding station, an overhanging arm 198 is rotatably mounted on shaft 194. Each overhanging arm 198 carries a small pressure roller, or caster, 200 in a swivel bracket 202. The swivel bracket 202 has a shank 204 that extends through a longitudinal slot 206 in arm 198 and is adjustably retained therein by a pair of collar nuts 208.

Each overhanging arm 198 is individually rotatable on its respective shaft 194 and may be manually swung up and back to permit replacement of ball B at the winding station. Provision is also made to raise all of the overhanging arms 198 simultaneously on either of the two shafts 194. In order to accomplish this, each of the overhanging arms 198 has a rearwardly extending flange 209 which normally rests against an adjustable screw 210 carried by a finger 212. Finger 212 is an extension of a sleeve 214, which is pinned to the shaft 194 by a set screw 216. With respect to FIG. 2, rotation of the left hand shaft 194 in the clockwise direction and rotation of the right hand shaft 194 in the counter-clockwise direction, will depress the fingers 214 and cause the associated arms 198 to be rotated upwards.

Figure 3:
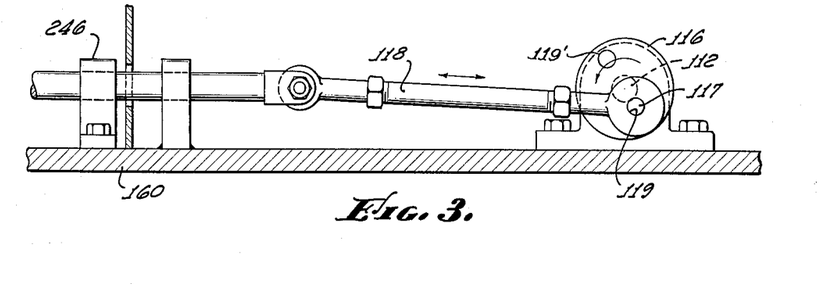
FIG. 3 is a side view of the cam shown in FIG. 1.

With reference to FIG. 3, a more detailed side view is presented of the cam and cam follower, which applies reciprocatory motion to the rod 118. A driving disc 116 is mounted on the end of the shaft 120. A crank pin 117 at the end of the rod 118 engages an aperture 119 in the driving disc 116. Rotation of the shaft 120 is translated into reciprocation of rod 118 through the pin and crank connection. Provision of other apertures at different radii provides an adjusting in the amount of reciprocation travel transmitted to rod 118.

Figures 4, 5, 6:
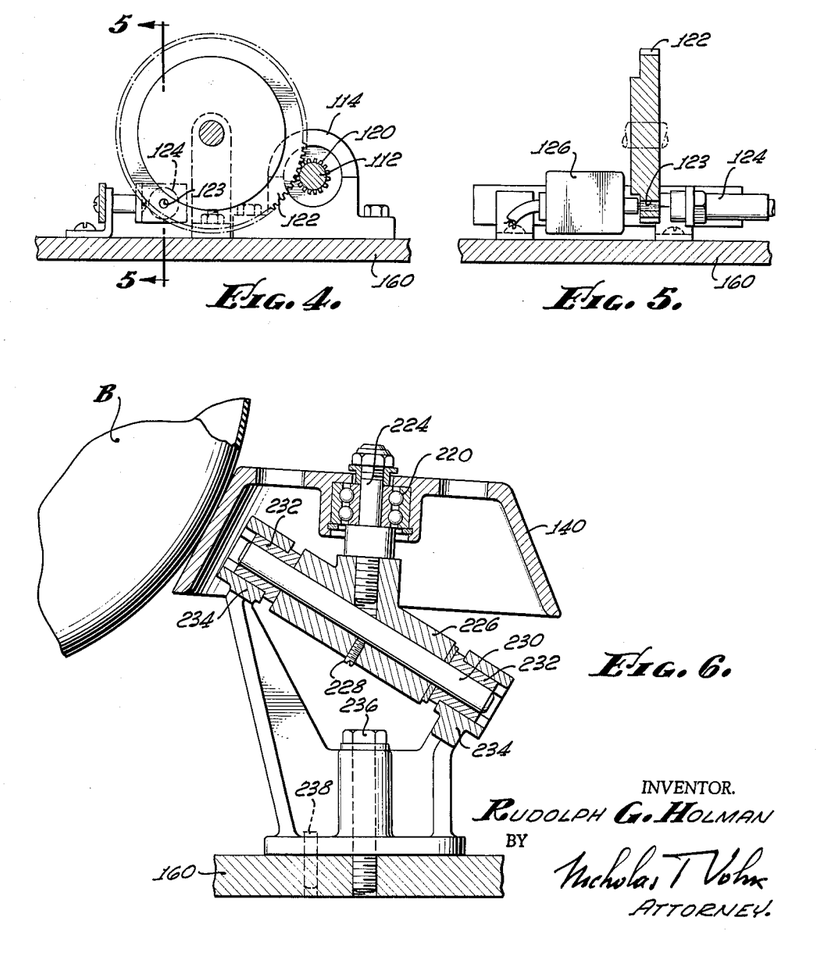
FIGS. 4, 4–A and 4–B are side views of the revolutions pulse generator shown in FIG. 1.
FIG. 5 is a sectional view of the pulse generator of FIG. 4 taken along line 5—5.
FIG. 6 is a sectional view of an idler roller taken along line 6—6 shown in FIG. 1.
Figure 4A:
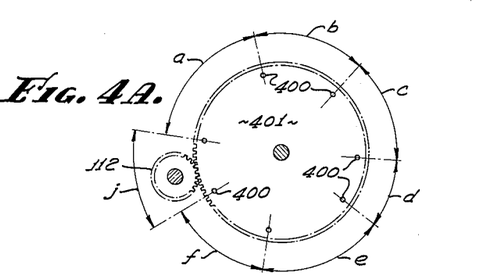

With reference to FIG. 4, pinion 120 and geared disc 122 of FIG. 1 are shown in greater detail. FIG. 5 is a sectional view of the apparatus of FIG. 4 taken along line 5—5 and viewed in the direction of the appended arrows. Light source 124 is mounted opposite photo cell detector 126. The light beam, provided by source 124, is normally interrupted by rotating disc 122. At the passage of aperture 123, a light path is completed, generating a pulse in pickup 126. In one specific embodiment, illustrated in FIG. 4, a single aperture 123 is provided in the rotating disc 122. The gear ratio of the pinion 120 and disc 122 is such as to provide a single revolution of disc 122 for each six revolutions of pinion 120. Accordingly, one pulse is generated by photo cell 126 for each six revolutions of shaft 112, or for each six complete reciprocations of rod 118. In FIG. 4-A the gear ratio is larger, and disc 401 has a plurality of apertures 400. In this case, an equal number of turns is wound on the ball during each "wind" period if the apertures 400 are uniformly distributed around disc 401. The apertures are spaced in a non-uniform manner in FIG. 4-A, and, therefore, the number of turns wound during the "wind" periods will be unequal.

With reference now to FIG. 6, a single beveled roller 140 is shown in greater detail. The roller 140 is mounted by means of a ball bearing 200 on a spindle 224, which is carried by an inclined sleeve 226. The inclined sleeve 226 is fixedly held by a set screw 228 on an inclined pivot pin 230. The opposite ends of pivot pin 230 are journaled in suitable bearing bushings 232 rotatively mounted in bracket 234. Each bracket 234 is fixedly mounted by a central screw 236 to the base plate 160 and is secured against undesired rotation on the plate by a suitable key, or dowel, 238.

Figure 2:
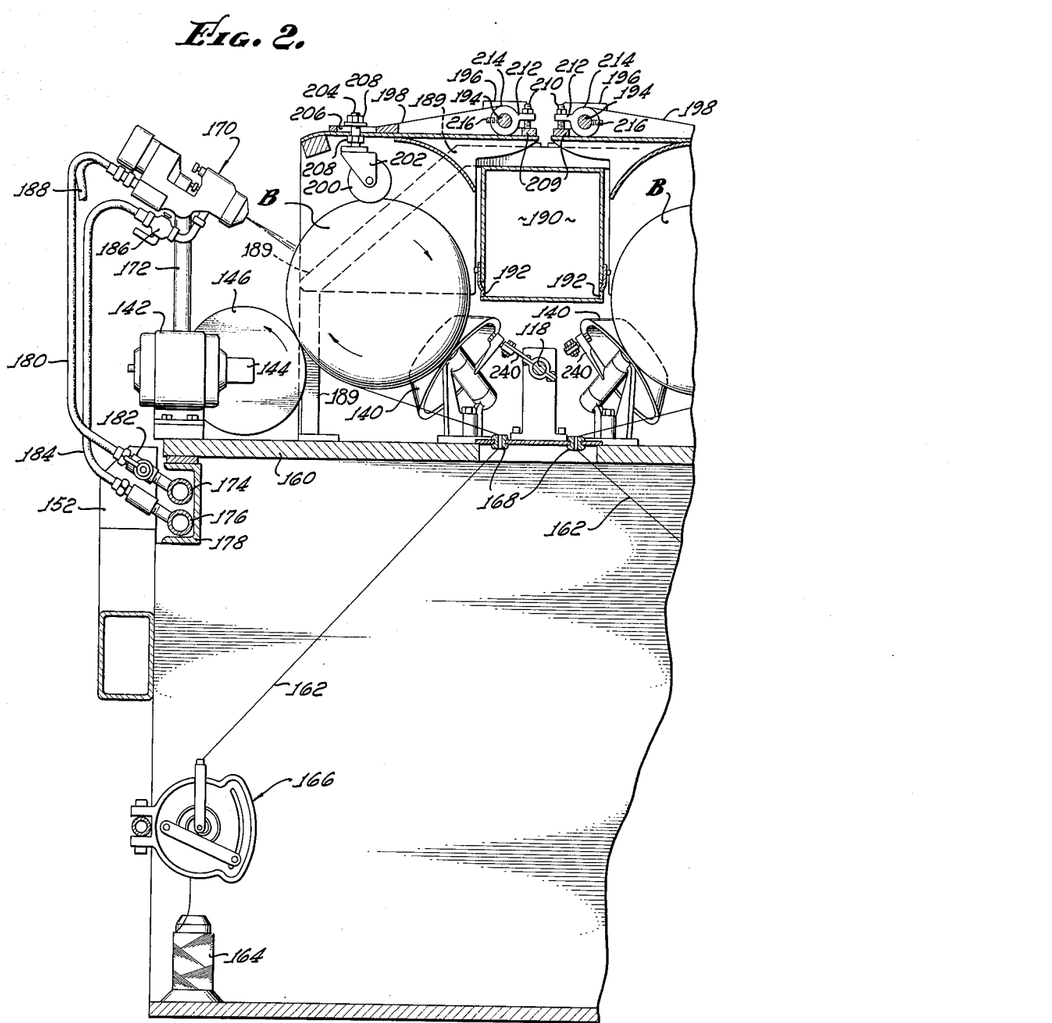
FIG. 2 is a vertical sectional view of the winding mechanism at one of the winding stations.

Sleeve 226, which carries the spindle 224, has a control arm 240, best seen in FIGS. 1 and 2, which oscillates the idler roller 140 about the axis of the inclined pivot pin 230. Referring again to FIG. 1, the two control arms 240 of the idler roller 140 of each winding station are connected to corresponding links 242, and links 242 are connected to brackets 244. All of the brackets 244 are fixedly mounted on the longitudinally reciprocating rod 118, seen also in FIGS. 1 and 2. The rod is slidingly mounted in suitable bearings 246 and, when reciprocated, rod 118 causes the simultaneous oscillation of all the idler rollers 140 of the two rows of winding stations.

As may be seen in FIG. 2, the axis of the drive roller 146 at each winding station is positioned in a direction approximately 45° downward from the horizontal plane passing through the center of ball B. The axis of oscillation (see FIG. 6) of each of the idler rollers 140, that is, the axis of the inclined pivot pin 230, passes through the point of tangential contact of the beveled idler roller 140 with the periphery of ball B and intersects the center of the ball at an angle of 45° downward from the horizontal plane passing through the center of the ball.

Figure 7:
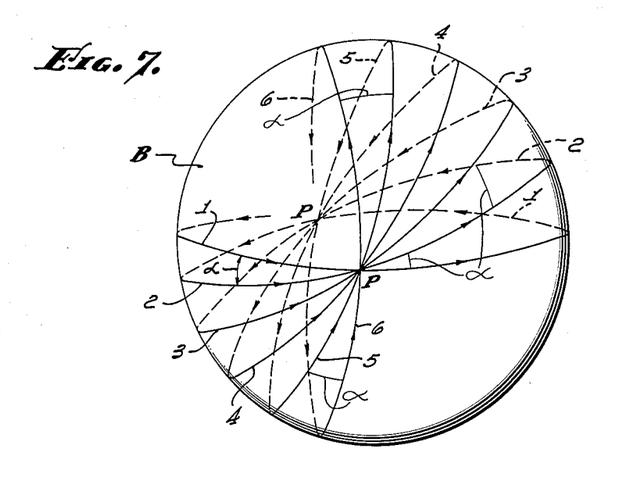
FIG. 7 is a diagrammatic view of a sphere with a group of winding turns constituting a portion of the winding applied during one program cycle.
Figure 8:
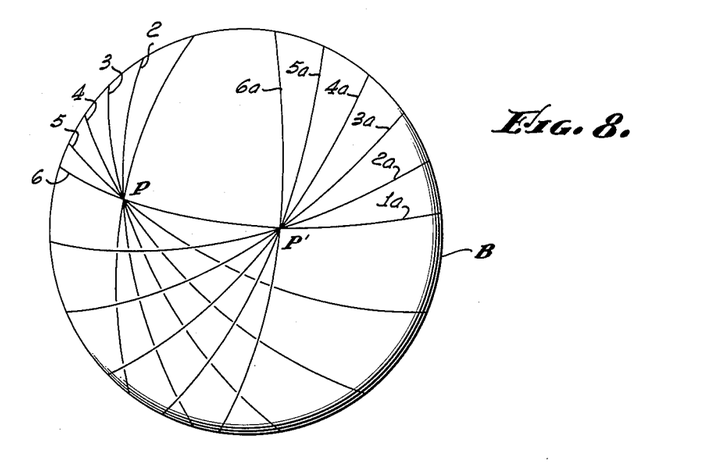
FIG. 8 is a similar view showing a second succeeding winding period of the next program cycle added to the first program cycle to show the geometrical relationship between successive program cycles.
Figures 8A, 8B, 8C:
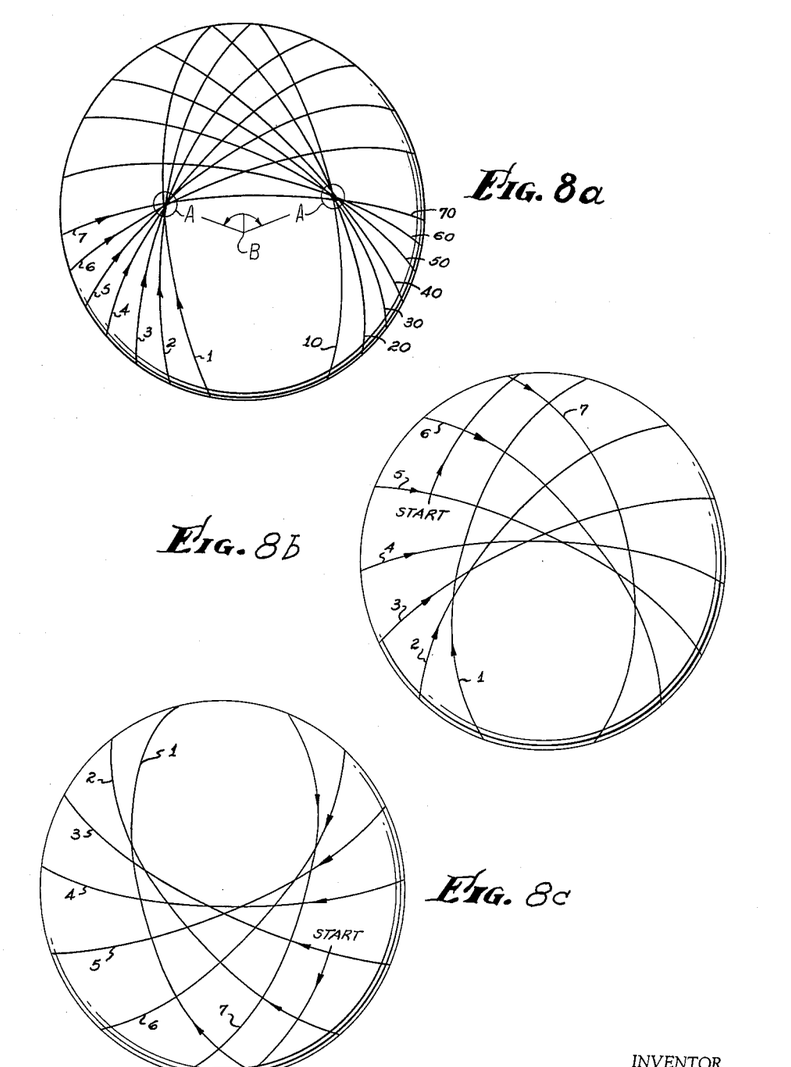

In operation, the rate of oscillation of the reciprocating rod 118 is carefully controlled. In one type of cycle producing the winding pattern illustrated in FIGS. 7, 8 and 8-A, the reciprocation is adjusted so that one complete reciprocation of rod 118 occurs in the time required for the driving roller 146 to rotate ball B through one revolution. The amount by which the idler rollers 140 pivot, or turn on their respective axes during the reciprocation of rod 118, determines the angular separation of two successive turns of thread on the surface of the ball. It may be noted that successive turns of the winding are displaced by an angle α (see FIG. 7) which, in the illustrated cycle, is shown to be equal to approximately 15°. Therefore, in six turns, approximately two quadrants of ball B will have winding applied thereto, as illustrated in FIGS. 7, 8 and 8-A.

Angle α may be altered by suitable adjustment of the various linkages in the control of the idler rollers 140, or by relocation of pin 117 (FIG. 3), into a different aperture 119' having a larger or smaller radius of rotation.

By disengaging clutch 108 and energizing brake 110 of FIG. 1, the oscillation of the reciprocating arm 118 is stopped while the rotation of ball B continues. When ball B rotates and rod 118 is at a standstill, thread 162 is wound on ball B along either a great circle or a small circle. When clutch 108 is again energized, a new set of turns will be wound upon the ball, as shown in FIG. 8, having a new pole P' and including turns 1a through 6a. In similar fashion, additional sets of turns may be applied to the ball, the poles migrating uniformly over the surface through the length of the great or small circle arc 800, such that a disposition of the poles and a uniform distribution of wound material is achieved.

The thread is wound along a great circle if the oscillation of rod 118 is stopped at that position which makes the rotational axis 250 of ball B (FIG. 1) parallel to the rotational axis 251 of the drive wheel 146. The oscillation of rod 118 may cease at some other point, when axis 250 is at an angle with respect to axis 251, in which case thread 162 will follow the path of some small circle, the small circle being a minimum circle when rod 118 stops either at its extreme inward or extreme outward positions. It is possible to stop the oscillation of rod 118 at a reasonably constant point of its oscillatory path. Motor 100 will be required to furnish minimum starting torque if rod 118 is stopped at one of its two possible extreme positions.

Referring to FIG. 7, there is represented a ball having six turns applied thereto during the first program cycle, the successive turns of the cycle being numbered 1 to 6. In this particular instance, the illustrated program cycle is of the type in which all of the windings intersect at two polar points P, there being two such polar points at diametrically opposite positions on the periphery of the ball, and the number of turns has been limited to six turns. Moreover, the successive turns of the winding are displaced by an angle α which, in the selected program cycle, is equal to approximately 15° as measured by the angles at the polar point P. Thus, the total displacement for this particular program cycle is 90° and the completed winding period of the program cycle covers approximately two diametrically opposite quadrants of the spherical area of the ball. As will be pointed out later, the number of turns, angle and the locus of points P may be varied in each winding period of each program cycle, which cycle includes the winding period and the pause period. The duration of the single rotation period, which produces arc 800, can be varied also, and it is the duration of the single rotation period that determines the angular displacement, and the length of arc 800, of the "polarized group of turns" (turns 1 through 6 in FIG. 7) which are produced during the double rotation period of each program cycle. This will be discussed more in detail in connection with FIGS. 8, 8-A and 8-B.

FIG. 8 shows the next succeeding polarized group of turns comprising six identical turns, number 1a to 6a, intersecting at a pair of diametrically opposite pole points P'. It is to be noted that the last turn 6 of the first winding program cycle is continued, the two poles P and P' being spaced apart on the continuation of turn 6. The circular distance P–P', or arc 800, is, of course, a fraction of a circle, and in the selected example, angle β, which is the angle subtended by points P and P', is equal to 120°. (The drawings do not illustrate this angle in its true dimensions; it is much smaller than 120° in FIGS. 8 and 8-A, in order to show more clearly the two sets of turns and the two poles.) In the same way, a third successive polarized group of turns, which is not shown in FIGS. 8 and 8-A, would start with the continuation of the turn 6a and one of the poles of the third winding period would be on the turn 6a, the adjacent poles being displaced by 120°. It is apparent that the paths described by the successive pairs of poles will conform to a particular geometrical pattern, the selected pattern of pole migration being such as to achieve the desired uniform distribution of the wound material over the spherical area of the ball.

Before concluding with the description of the selected program cycle, it may be helpful to discuss more in detail the concentration or dispersion of the intersections at the two polar regions formed of a winding program cycle. In the disclosed program cycles, maximum concentration is achieved when the intersection of the successive turns of a single double rotation period takes place at two precise polar points, as shown in FIGS. 7 and 8. Lesser concentration of the intersections is accomplished by dispersal of the successive intersection points over a polar region, as shown in FIG. 8-A and a still lesser concentration is accomplished when the region of concentration is extended over a curved line, as illustrated in FIGS. 8-B and 8-C. In practice, the intersection is of the type shown in FIG. 8-A, along an area A indicated by a dotted line because of minor variations in slippage that takes place between the ball and the driving mechanism. It is also possible to obtain a much larger dispersion illustrated in FIGS. 8-B and 8-C. If the relationship of the speed of rotation of the ball to the speed of complete oscillation of rod 118 is as indicated above (one-to-one ratio), then the angular positions of the respective turns 1 through 6 will be of the type illustrated in FIGS. 7 and 8. If the direction of the angular shift of each point of the curve followed by the thread is examined in the plan view indicated in FIGS. 7 and 8, one can see that there is a continuous angular shift of the winding in the counter-clockwise direction from turn 1 to turn 6, this counter-clockwise shift taking place around the pole P in FIG. 7 and the poles P and P' in FIG. 8.

This counter-clockwise shift also applies to the half turns on the other side of the ball, which are illustrated by a series of dotted lines. Such continuous counter-clockwise shift takes place even though rod 118, obviously, has a strictly reciprocating motion because, as rod 118 moves in one direction, ball B travels 180° and, therefore, when rod 118 begins to move in the opposite direction, it engages the opposite hemisphere of the ball with the net result that insofar as the position of the turns on the ball is concerned, they constantly shift and rotate the ball around the second, or the vertical axis, in the counter-clockwise direction, when viewed in FIG. 7, around pole P.

FIGS. 8-B and 8-C illustrate the two winding patterns when one complete oscillation of rod 118 does not take place in the period of time required for making one complete revolution of ball B. In FIGS. 7, 8 and 8-A, the ratio is 1:1 ratio, as it was mentioned previously. The 1:1 ratio means that one complete revolution of ball B takes place in exactly the same time required for rod 118 to make its complete oscillation. When this is the case, then the winding pattern is of the type illustrated in FIGS. 7, 8 and 8-A, with the poles P—P and P'—P' well defined and the turns all passing through the poles, or at least a relatively small area, such as area A in FIG. 8-A. Thus, if the ball makes one revolution in some unit time, 1, then rod 118 makes its oscillation also in the same unit of time, 1. Hence, the 1:1 ratio. This ratio may have other values, such as 1:1.2 or 1.15:1, with the results for such ratios being illustrated in FIGS. 8-B and 8-C. In FIG. 8-B, the ball revolves slightly faster than the oscillation of the rod, and in FIG. 8-C, the ball revolves slower than the oscillation of the rod. The limits of this ratio cannot be too wide, because each turn should approximate a great circle as much as possible, and this is accomplished by making the ratio close to 1:1 ratio and angle α as small as possible. It is obvious that nothing will be accomplished by making angle α=0, and, therefore, a suitable magnitude for α is in the order of 10°–20°, and the limits of the ratio are 1:1.005 for minimum and 1:1.05 for maximum.

For a more detailed description and a mathematical treatment of the winding patterns, reference is made to my earlier applications, S.N. 705,994, filed December 30, 1957, now Patent No. 2,995,311 and S.N. 754,551, filed August 12, 1958 (now abandoned), which is the continuation-in-part of S.N. 513,280, filed June 6, 1955 (now abandoned), and U.S. Patents 3,071,331 issued January 1, 1963 and 3,136,492, issued June 6, 1964.

It is to be noted that ball B continues to rotate during the double rotation period as well as during the single rotation period. Therefore, during the single rotation period the oscillation of rod 118 pauses while ball B continues to rotate at constant peripheral and angular velocities. Pausing of rod 118 at once changes the path of the thread from a "polarized spiral path" either to a great circle path or a small circle path, depending on the position of the ball axis 250 when roller 140 stopped moving.

There is another important change that takes place at the beginning of the single rotation period. As stated previously, clutch 108 becomes de-energized, brake 110 becomes energized, and, therefore, shaft 112 stops. This means that disc 122 also stops. Disc 122 stops after the photo cell 126 becomes energized and impresses a signal on the electronic circuits which will be described later. It is this signal that de-energizes clutch 108 and simultaneously energizes brake 110. Brake 110 is used for prompt stopping of shaft 112 so that the double rotation period will always remain constant in its duration, rather than depend on a random stopping of the oscillatory mechanical system including rollers 140, rod 118, shaft 112 and disc 122. From the point of view of the winding pattern, it is best to stop rod 118 in that position—midway between the extreme positions—which makes axis 250 parallel to axis 251 and, therefore, thread 162 follows the path of a great circle between points P and P' in FIG. 8, i.e., during the single rotation period. Mechanically, it is more advantageous to stop in one of the two extreme positions, when the rollers 140 momentarily are at a standstill, and, therefore, will require no power to stop them.

Figure 9:
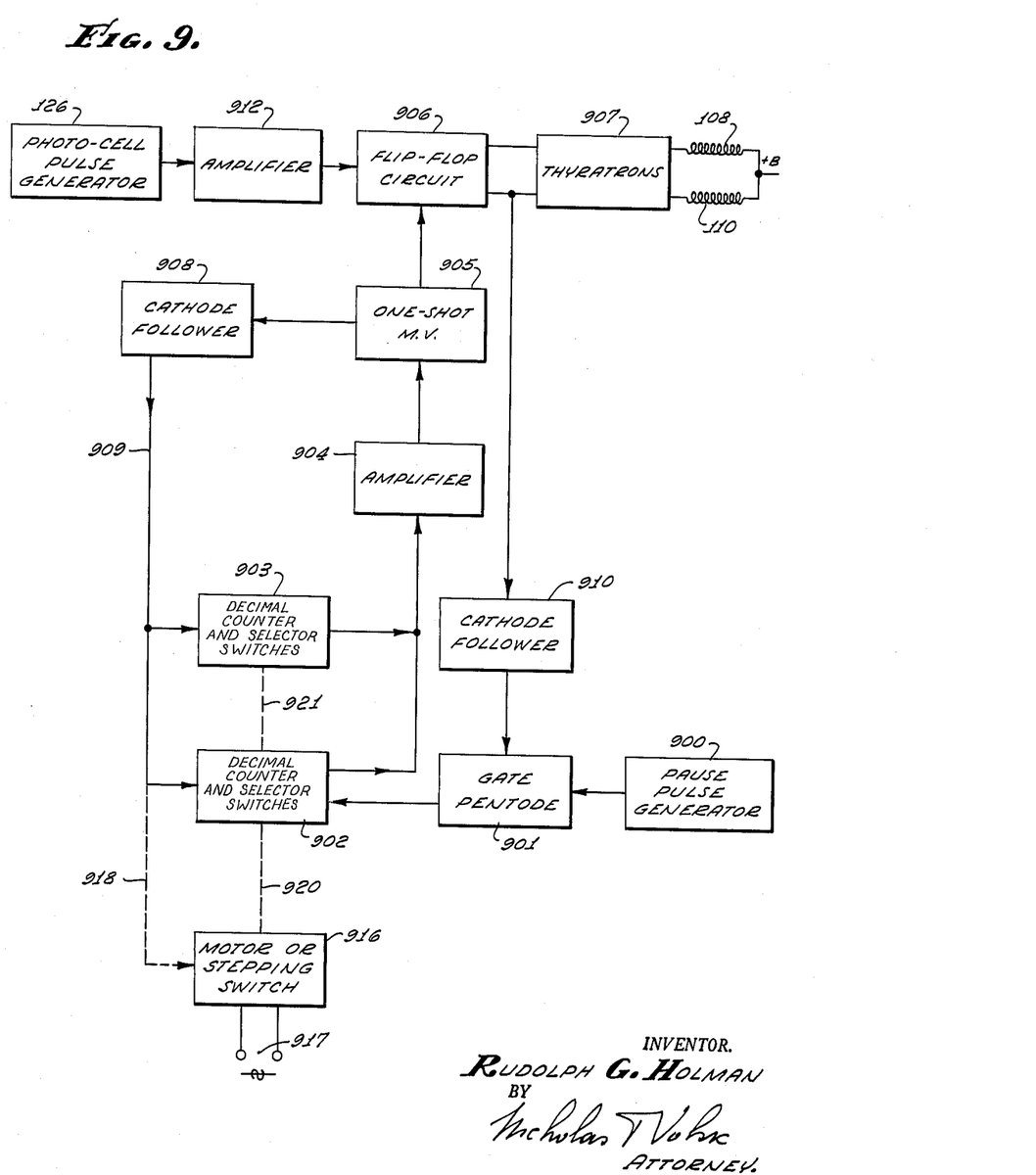
FIG. 9 is a block diagram of the electronic portion of the control system.

Referring to FIG. 9, this figure illustrates a block diagram of the electronic portion of the control circuit including the double rotation wind as well as the single rotation, or pause, control elements. Beginning the description of FIG. 9 with the pause circuit, it includes a pause pulse generator 900 which, as mentioned previously, in one specific example, is a generator which produces 120 cycles per second by merely rectifying and pulse shaping a conventional 60 cycle frequency. The output of the pause pulse generator is impressed on a gate pentode 901 which is rendered conductive only when the entire control system is placed into the pause position. During this period the gate pentode amplifies the pulses impressed upon it by generator 900 and transmits them to a decimal counter 902, where the impressed pulses are counted by the counters 902 and 903 which are connected in such manner that counter 902 counts pulses from 1 to 9 and counter 903 counts pulses from 10 to 99. These counters are pre-settable decimal counters which are well known in the electronic counter art and need no detailed description. However, some additional information concerning this type of counter will be given still later in connection with the description of FIGS. 10 and 11.

Decimal counters 902 and 903 impress a coincidence pulse on amplifier 904 after a predetermined number of pulses have been impressed upon counter 902 by pentode 901. The output of amplifier 904 in turn is impressed on a one-shot multivibrator 905, which amplifies and shapes the pulse impressed upon it by amplifier 904 and then impresses a control pulse on a flip-flop circuit 906, which has two stable states, or two states of conductivity, the flip-flop circuits of this type being well known in the art. They are the modifications of the Eccles-Jordan circuit. Suffice it to say that when a control pulse is impressed by multivibrator 905, one triode in the flip-flop circuit is rendered conductive while the other triode is rendered non-conductive. The two triodes of the flip-flop circuit 906 are connected to two gas-filled thyratrons 907 which are controlled by the two output signals produced by flip-flop circuit 906. The thyratrons are used merely as power tubes which are capable of furnishing sufficient amount of current for proper energizing of brake winding 110 and the clutch winding 108, the brake and the clutch windings being connected directly in series with the cathode plate circuits of the thyratron. Therefore, when one thyratron is energized, the other is de-energized and the same is true of the windings.

The one-shot multivibrator also includes a feedback circuit which is used for re-setting the decimal counters 902 and 903. This circuit includes a cathode follower 908, the output of which is impressed on the two counters over conductor 909. The counters 902 and 903 require a reset signal which resets all of the electronic tubes used in the counters to their original positions. This counter reset signal is furnished by the one-shot multivibrator 905 through cathode follower 908 which resets the counters to their original positions so that they could begin a new count of the pause pulses produced by the pause pulse generator 900. This new count, however, should not begin immediately upon the conclusion of the first count, but it should begin only after the conclusion of the double rotation wind period and at the beginning of the next pause period which follows the wind period. It is to be remembered that the pause pulse generator 900 generates the 120 pulses continuously, and, therefore, it becomes necessary to impose a gate between the pause pulse generator 900 and counter 902 so that the pause pulses would become blocked immediately upon the completion of any given pause period and simultaneously with the beginning of the double rotation wind period. This gate is pentode gate 901, one control grid of which is connected to the pulse generator 900 and the other grid connected to a cathode follower 910 which impresses a gating pulse on gate 901 every time the conductivity of the flip-flop circuit 906 is changed, either by the pause control circuit or the double rotation wind control circuit. In this manner, pause pulse generator 900 impresses signals on counter 902 only when the entire system is ready to have the single rotation pause period.

The wind control circuit begins with the photo-electric cell pulse generator 126 which corresponds to the similarly numbered generator illustrated in FIG. 5 and which was described previously. It may be recalled that photoelectric pulse generator 126 becomes energized every time a source of light 124 (FIG. 5) energizes photo cell 126 by passing the light through aperture 123. This photoelectric cell pulse is impressed on an amplifier 912 and the output of the amplifier is impressed on the flip-flop circuit 906 which in turn controls thyratron 907 and windings 108 and 110 in the manner described previously. Accordingly, the photo-electric cell pulses in FIG. 9 are used directly for controlling the energization and de-energization of the clutch and brake windings and there is no decimal counter in the wind control circuit.

The operation of the control system should be apparent from the description of the block diagram. The pause pulses are impressed on the gate pentode 901 which is conductive only during the pause period. The pulse transmitted by the gate pentode is counted by the decimal counters 902, and 903, which deliver a coincidence pulse on amplifier 904 after a predetermined number of pulses has been counted by the counters. The counters have selector switches and the setting of these switches determines the occurrence of the coincidence pulse after a predetermined number of pause pulses has been impressed on counter 902 by generator 900. The conicidence pulse is then used for changing the conductivity of flip-flop circuit 906 and thyratron 907, which in turn controls the energization and de-energization of the brake and clutch windings 110 and 108.

It is to be noted that during the single rotation period, the photo-electric cell pulse generator does not deliver any pulses because wheel 122 is at a standstill because the brake winding 110 is energized and clutch winding 108 is de-energized during the single rotation period. Since there are no pulses delivered by the photo-electric cell pulse generator 126 during the single rotation period, it becomes unnecessary to have any gate between the cell and the flip-flop circuit 906. Therefore, the photo-electric cell pulse generator 126 is connected directly to the flip-flop circuit 906 through the amplifier 912.

FIG. 9 also illustrates a motor or a stepping switch 916 which may be connected to a source of alternating current 917 if it is a motor. If it is a stepping switch, it may be connected to conductor 909 in the manner indicated by conductor 918. When it is a stepping switch, then it follows that conductor 918 will deliver a stepping pulse to switch 916 at the end of each pause period. This stepping switch then, in turn, will change the setting of the decimal counter 903 and 902 with the aid of a shaft 920 and 921 connecting the stepping switch 916 to the setting switch of the decimal counters 902 and 903. It is not absolutely necessary to have shaft 921 since it is possible to vary the setting of the counter merely by changing the setting of counter 902, which in turn will have an effect on counter 903.

This arrangement will enable one to vary the duration of the single rotation period in any desired random fashion during the entire winding operation of the ball, with the result that the positioning of the group of turns produced during any given double rotation period will be displaced from each other in a random fashion. If element 916 is a motor rather than a stepping switch, then the rotational speed of this motor should be far removed from the rotational speed of the drive motor 142, so as to produce a truly random distribution of turns produced during each double rotation period. The random distribution that is discussed above is not a random distribution of the turns within each double rotation period, such as the six turns illustrated in FIGS. 7 and 8. The random distribution that is discussed here corresponds to the random length of the circular arc 800 illustrated in FIG. 8. In other words, circular arc 800 will not have a constant and fixed length as one progresses during the entire winding operation, but it will vary in random manner which will be determined by the operation of motor 916 and the settable switches in the decimal counters 902 and 903. There is a school of thought that such random distribution of the groups of turns gives a better overall winding than a fixed, repetitive pattern. The length of circular arc 800 should be less than 180° and several degrees greater than 0° in order to obtain proper distribution of thread over the entire surface of the ball.

Before proceeding with a more detailed description of the electronic control system which is used for energizing and de-energizing clutch 108 and brake 110, it is necessary to state here, by way of introduction, that it is possible to construct the control system in several different ways. Insofar as the single rotation period is concerned, the timing of this single rotation period in the disclosed system depends on a 120-cycle source of timing pulses which is independent of the rotation of shaft 112 and generates the pulses continuously, irrespective of whether shaft 112 is rotating or is at a standstill. These timing pulses are obtained by using a standard 60-cycle source of power, rectifying it in a four-way rectifier and then re-shaping the wave-form of the rectified wave into discrete pulses. Since the duration of the single rotation period is determined by the number of the pause pulses assigned for determining the duration of the pause period, it becomes desirable to have a decimal counter in the timing circuit which would be capable of counting the timing signals. It may be desirable in the control system of the above type, to produce a random distribution of the program cycles. If the setting of the decimal counter is varied at some random fashion, then the duration of the pause period will be also varied at random fashion with the concomitant random distribution of the program cycles throughout the entire winding. If there is no random variation of the pause period and the pause period thus remains constant throughout the entire period of time required for producing the entire winding on the ball, it then becomes necessary to adjust the setting of the decimal counter in such a manner so as to avoid the superimposition of the windings which would result in the polar regions becoming concentrated so close to each other that the ball becomes out of round or unevenly covered with the thread. To illustrate: If one complete revolution of the ball is obtained during 40 timing pulses, one suitable range for setting the counter is between 3 and 18 decimal counts, the average setting being 10. In this manner, it becomes possible to avoid the superimposition of the polar regions, assuming in all of the above discussions that the double rotation winding period is of such duration as to produce six complete turns such as those illustrated in FIGS. 7 and 8. The six turns produced during the wind period cover two 90° quadrants of the ball, and, therefore, it becomes necessary to avoid the concentration of the turns such that the pause period sector should be other than from 0 to 27 degrees; and from 162 to 180 degrees.

Accordingly, in light of the above discussion of the timing circuit, it follows that the timing circuit should always have a decimal counter as long as the pulses are in the order of 120 pulses per second, and the outside diameter of the ball and the speed of rotation of the ball are such as to produce one full turn of the ball during 40 timing pulses, or any other comparable relationship.

As to the wind period, it is possible to have two alternatives, and that is, the wind circuit may or may not have a decimal counter, depending upon the gear ratio between gears 120 and 122, and, therefore, the number of pulses produced by the photo-electric cell for each complete oscillation of rod 118 and for each revolution of shaft 112. In one example, mentioned previously, the gear ratio between gears 120 and 122 and the number of the apertures in disc (or gear) 122 is such that (there is only one aperture 123 shown in FIG. 4) six turns are produced for each complete revolution of gear 122. When this is the case, it becomes possible to dispense with the decimal counter altogether in the wind circuit and use the pulse produced by the photoelectric cell directly (after proper amplification, pulse-shaping, etc.) for direct actuation of the clutch and brake windings 108 and 110.

Figure 4B:
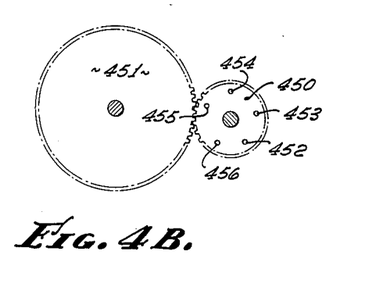

It is also possible to increase the number of the apertures and still further increase the gear ratio in that direction so as to decrease the angular velocity of disc 122 and, at the same time, increase the number of the apertures in the disc in the manner illustrated in FIG. 4-A. Even in this case it is still possible to avoid the use of a decimal counter in the photo-electric cell circuit, or the wind circuit, since the disc, or gear, 122 itself is used for timing the wind period by spacing the apertures in the manner illustrated in FIG. 4-A, this figure having been described previously. However, it is also possible to change the gear ratio in the opposite direction so as to speed up the rotation of gear 450 by decreasing its diameter and increasing the diameter of driving gear 451 in the manner indicated in FIG. 4-B. If, in addition to the above, wheel 450 is provided with a plurality of apertures, such as five apertures 452 through 456 illustrated in FIG. 4-B, it then becomes necessary to have a decimal counter in the wind circuit as well, because a large number of pulses may be generated even during a single revolution of the ball. A circuit of this type may be suitable when it is contemplated to control the number of turns produced in any given double rotation wind period.

In view of the above, the description of the wind control circuit will include the description of the two circuits. The first circuit is that which does not use a decimal counter and the second is the one which uses the decimal counter in the wind control circuit.

Figure 10:
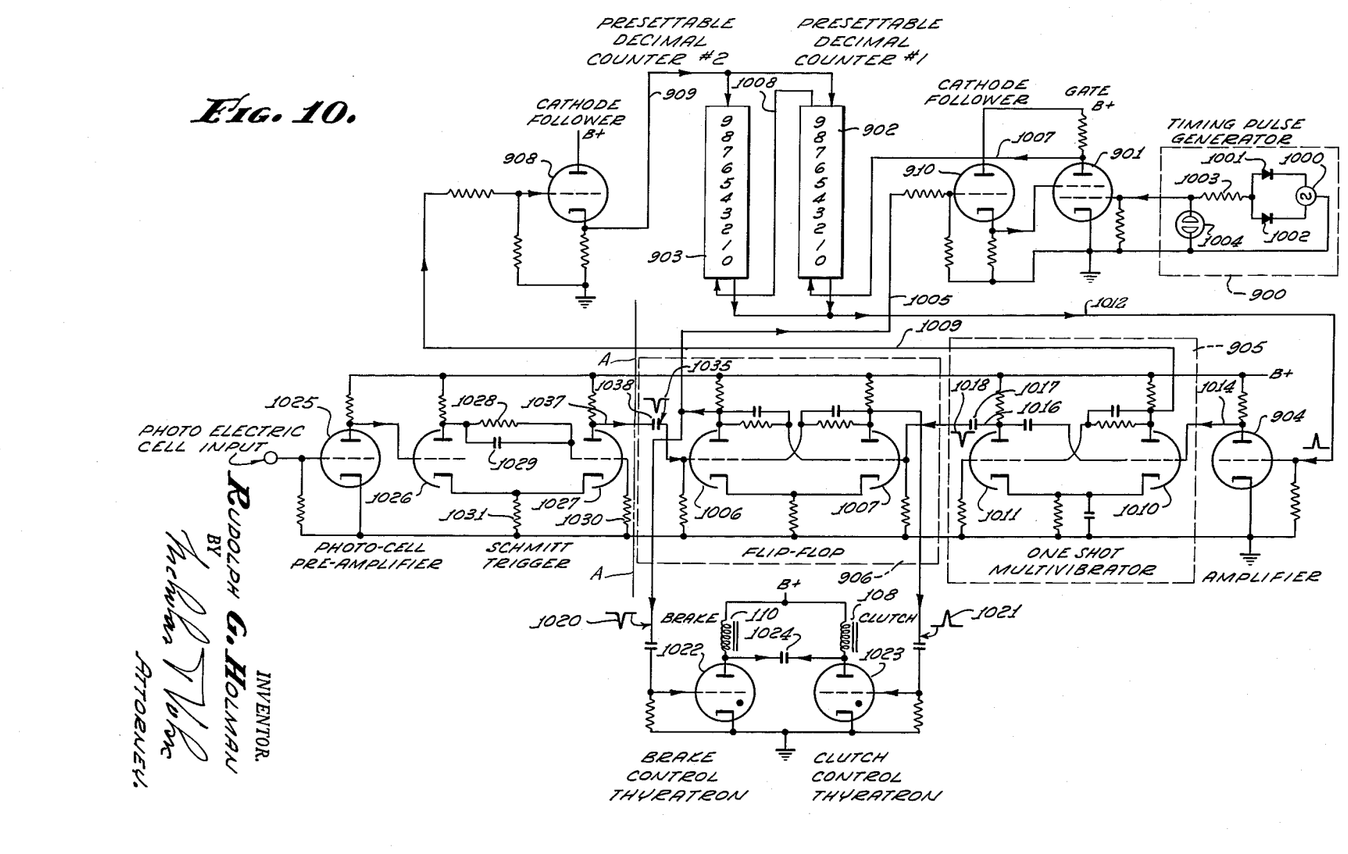
FIG. 10 is a schematic diagram of FIG. 9.

Referring now to FIG. 10, this figure is the schematic diagram of the control system illustrated in FIG. 9. Beginning once more with the description of the pause control circuit, the source of 60 cycles, 1000, is connected to two rectifiers 1001 and 1002 and a resistor 1003 and a gas-filled tube 1004 which are used for rectifying and reshaping the rectified wave impressed on the rectifiers 1001 and 1002 by source 1000. Discrete pulses, therefore, appear on the grid of a gate pentode 901, the control grid of which is connected directly across a gas-filled tube 1004. The second control grid of the gate pentode 901 is connected to a cathode follower 910. The grid of the cathode follower 910 is connected over conductor 1005 to the plate of triode 1006 in the flip-flop circuit 906. The flip-flop circuit also includes triode 1007. The output of the gate pentode 901 is connected to the decimal counter 902 over a conductor 1007 and the output of the decimal counter 902 is connected to the decimal counter 903 over a conductor 1008. The cathode follower 908 is connected to the decimal counters 902 and 903 over the conductor 909 for resetting the two counters in the manner described previously. The cathode follower 908 is connected to the one-shot multivibrator 905 over a conductor 1009. This conductor is connected directly to the plate of a triode 1010 which is the second triode in the one-shot multivibrator circuit 905, the first triode being triode 1011. A coincidence pulse from the decimal counters 902 and 903 is impressed on a triode amplifier 904 over a conductor 1012, and this amplifier in turn energizes the one-shot multivibrator 905 over a conductor 1014 which connects the plate of triode 904 directly to the grid of triode 1010. The output of triode 1011 of the one-shot multivibrator 905 is connected over a conductor 1016 and a capacitor 1017, to the grid of triode 1007 of the flip-flop circuit, and in this manner the timing pulse generator 900 changes the state of conductivity of the flip-flop circuit 1006–1007. The one-shot multivibrator 905 impresses a negative pulse 1018 on the control grid of triode 1007 upon the conclusion of the pause period. This renders triode 1007 non-conductive and triode 1006 conductive, with the result that triode 1006 impresses a negative pulse 1020 on the grid of a thyratron 1022, while triode 1007 impresses a positive pulse 1021 on the grid of thyratron 1023. The positive pulse 1021 makes thyratron 1023 conductive which at once impresses a negative pulse on the plate of thyratron 1022 through a capacitor 1024, which makes thyratron 1022 non-conductive, thus reversing the state of conductivity of the two thyratrons. Accordingly, the brake winding 110 becomes de-energized and the clutch winding 108 becomes energized and the system begins its double rotation wind period.

The photo-electric cell-controlled wind circuit begins in FIG. 10 with a triode 1025 which receives the signal from the photo-electric cell, amplifies it and then impresses it on the Schmitt trigger circuit including triodes 1026 and 1027. The Schmitt circuit includes a differentiating network 1028–1029 in the plate circuit of triode 1026, and the grid of triode 1027, this grid being connected to ground through resistor 1030. The common cathode resistor 1031 connects the cathodes of the two triodes to ground. The pulse which is generated by photo-electric cell may have a relatively long duration, its duration depending upon the diameter of the aperture 123 in wheel 122. This pulse is amplified and re-shaped in the Schmitt trigger circuit which impresses a short negative pulse 1035 on the grid of triode 1006, rendering it non-conductive, triode 1007 conductive, and thyratron 1023 non-conductive, with the result that clutch 108 becomes de-energized and brake 110 becomes energized. Thus, there is the beginning of the pause period at the conclusion of the wind period.

Figure 11:
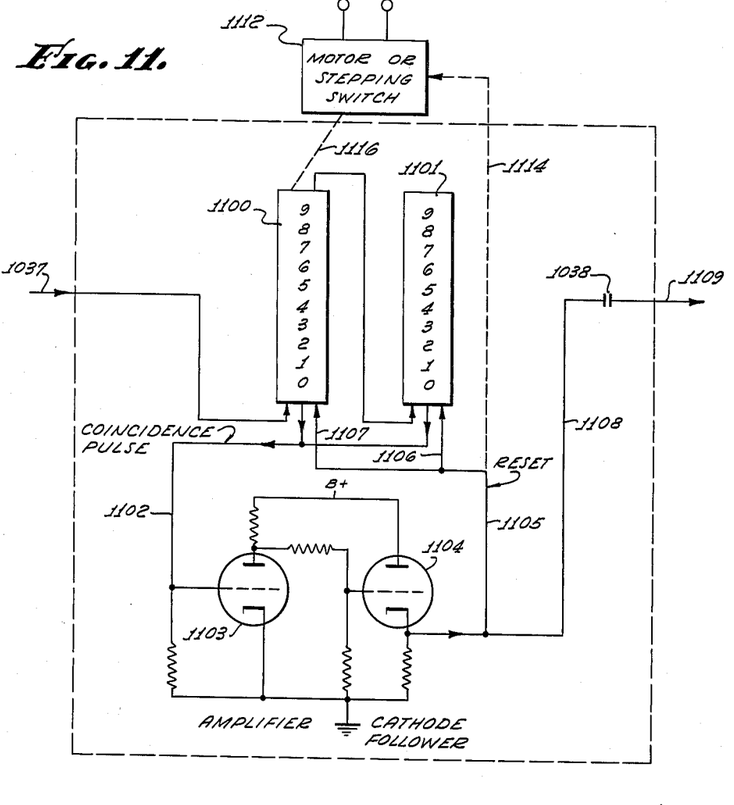
FIG. 11 is the schematic diagram of the counter which may be included in the photo-electric cell circuit of FIGS. 9 and 10.

When the photo-electric cell scanning disc is of the type illustrated in FIG. 4–B at 450, and the ratios between the two wheels 451 and 450 is of the type also illustrated in FIG. 4–B, it becomes necessary to include a resettable decimal counter in the photo-electric cell circuit as well, and this is illustrated in FIG. 11, which illustrates the connections of the counter. The counter is inserted into the photo-electric cell circuit at line A—A indicated in FIG. 10. Conductor 1037 in FIG. 10 corresponds to a similarly numbered conductor 1037 in FIG. 11, and capacitor 1038 corresponds to a similarly numbered capacitor 1038 in FIG. 11. Between conductor 1037 and capacitor 1038, a decimal counter 1100–1101 has been inserted in FIG. 11 and the output of the counter is impressed on a conductor 1102 which impresses the coincidence pulse appearing in the output of the counters 1100 and 1101 on the grid of triode 1103, which acts as an amplifier. The output of amplifier 1103 is impressed on a cathode follower 1104 and the output of the latter is impressed on the counter 1100–1101 over conductors 1105, 1106 and 1107, and it is also impressed on capacitor 1038 over conductor 1108, whereupon conductor 1109 impresses it on the grid of triode 1006 in FIG. 10, which is the left triode of the flip-flop circuit.

With the circuit illustrated in FIG. 11 incorporated in the photo-electric cell circuit in FIG. 10, it becomes possible to count the number of pulses delivered by the photo-electric cell and in this manner, it also becomes possible to control the number of turns produced on the ball during the wind period, i.e., it may be adjusted to any desired manner within the limits of the counter 1100–1101, which, being connected in cascade manner, is capable of counting from 1 to 99. Hardly any occasion will ever arise when the number of turns in one single wind period will be as high as the highest count of the counter and if the number of turns is never expected to exceed 9, then counter 1101 may be dispensed with altogether and only counter 1100 incorporated into the circuit, in which case, the count will be limited from 1 to 9.

It has been previously mentioned in connection with the discussion of FIG. 9, that it is possible to alter the setting of the settable switches in the counters included in the pause control circuit. The same variation of the counter settings can be also provided in FIG. 11 and this is illustrated by motor, or stepping switch, 1112. A dotted line conductor 1114 connects switch 1112 (if it is a switch) to the reset circuit 1105, with the result that the stepping switch is stepped once at the end of each wind period. The switch in turn resets the switches in counter 1100 with the aid of a shaft 1116. In this manner, it becomes possible to vary the number of turns in each successive wind period. The variations in the number of turns may be quite limited so that, for instance, the number of turns never varies more than from, say, 3 to 12, in which case, the minimum number of turns is 3 and the maximum number of turns is 12. This variation of the turns is in accord with the theory that a random distribution is superior to a fixed pattern.

For a more detailed description of the counters, such as counters 1100 and 1101, FIG. 11, and counters 902 and 903, in FIGS. 9 and 10, reference is made to the counters manufactured by Computer Measurements Corporation, 12970 Bradley Avenue, Sylmar, California, which are known as Models 101–A and 100–A, and are called by the above company as "Pre-Set Decade Counting Units."

Figure 12:
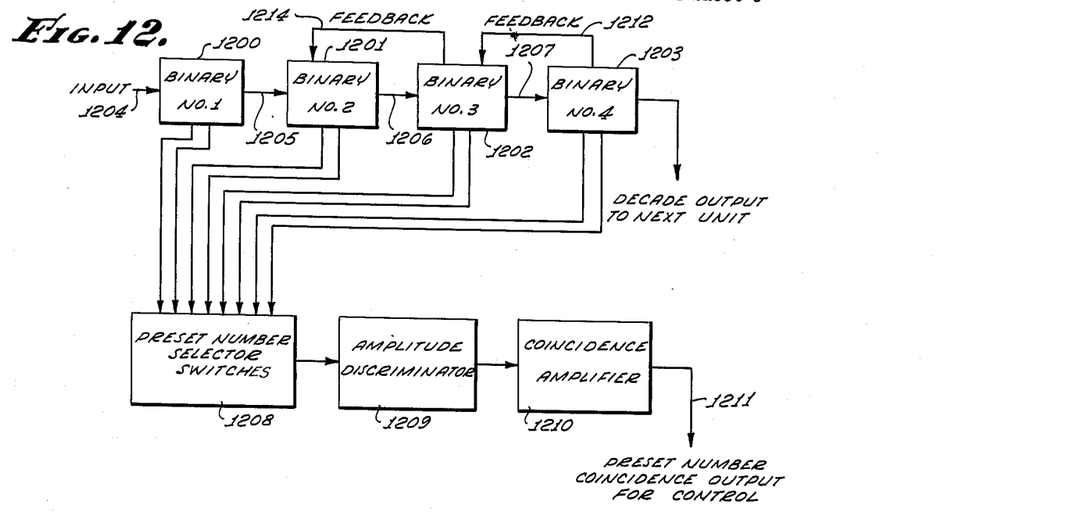
FIG. 12 is a block diagram of a decimal counter.
Figure 13:
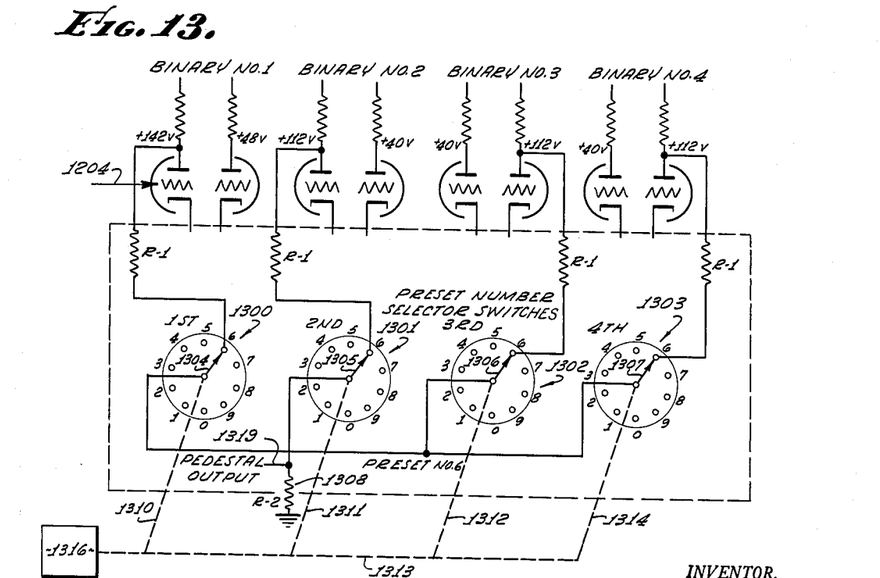
FIG. 13 is a partial schematic diagram of a decimal counter.

Before concluding the description of the control system, it is desirable to mention, if only briefly, the nature of the counters 902 and 903 and 1100 and 1101. The block diagram of the counter of the above type is illustrated in FIG. 12 and a portion of the schematic diagram of such counter is illustrated in FIG. 13. Since, as mentioned previously, counters of this type are well known in the art, only a very brief description is necessary.

Referring now to FIG. 12, the counter includes four binary counters 1200, 1201, 1202 and 1203, which are identical in every respect to each other. An input signal is impressed on a conductor 1204 and the binary counters are connected in tandem, as indicated by conductors 1205 through 1207. In order to convert the binary counters into decimal counters, the outputs of the binary counters are connected to the selector switches 1208 which produce an output signal having a pedestal and a useful signal on top of this pedestal. This variable amplitude signal is impressed on the amplitude discriminator 1209 and the output of the amplitude discriminator is impressed on a coincidence amplifier 1210 which produces a useful output signal on conductor 1211 that can be used for any desired control purposes. The binaries 1201 and 1202 require feedback circuits, which are indicated by conductors 1212 and 1214.

The partial schematic diagram of the binary counters and of the selector switches is illustrated in FIG. 13. The selector switches 1300, 1301, 1302 and 1303 have terminals from 0 to 9 and the selector switch arms 1304 through 1307 may be set on any number so as to produce a useful signal, mounted on the pedestal signal, across an output resistor 1308 after receiving a predetermined number of signals over conductor 1204. The circuit illustrated in FIG. 13 is that for obtaining a useful output signal on a conductor 1319 after six signals or pulses are impressed on conductor 1204. It is possible to use the same eight triodes for obtaining the desired decimal combinations on the output side of the selector switches by connecting the terminals of these switches to the plates of the eight triodes through appropriate resistance in the manner similar to that indicated in FIG. 13. In this manner, a decimal count is obtained from 0 to 9 and it is possible to vary the setting of the switches 1300 through 1303 so that a useful signal is obtained upon receipt of any number of signals from 1 to 9 on conductor 1204.

It has been mentioned previously that a variable number of turns and a variable single rotation pause period can be obtained by varying the settings of the selector switches in the decimal counter. These switches are switches 1300 through 1303 and the variation of the setting of these switches is indicated diagrammatically in FIG. 13 by dotted lines 1310, 1311, 1312 and 1314, which indicate a mechanical connection between the switches and shaft 1313. Shaft 1313 is connected to a motor 1316, or a stepping switch 1316, which either rotates or steps shafts 1310, 1311, 1312 and 1314 in the desired manner.

What I claim as new is:

1. A control system for an apparatus suitable for winding a cord on a spherical body by rotating said body solely around a first axis during a first single rotation pause period and simultaneously rotating said body around said first axis and a second axis during a second double rotation wind period, said system including first means coupled to said body for rotating said body around said second axis only during said second wind period, a motor for actuating said first means, a serially connected first pulse generator generating a first series of timing pulses, first gate and first counter for counting said first series of pulses, with said first counter having second means to generate a first control signal in response to a predetermined number of said first pulses, third means to vary the setting of said second means to vary said number and, thereby, to vary the duration of said second period, serially connected second pulse generator for generating a second series of pulses, second gate and second pulse counter, said second counter having fourth means to generate a second control signal in response to a predetermined number of said second pulses, fifth means to vary the setting of said fourth means to vary said number and thereby to vary the duration of said first period, a control circuit connected to the output sides of said first and second counters and responsive to said first and second control signals, the output side of said control circuit being connected to and controlling the operation of said motor to disconnect said motor from said first means in response to said first control signal and to connect said motor to said first means in response to said second signal.

2. In an apparatus for winding a cord on a ball at a winding station having first means for rotating said ball about a first axis during a first single rotation pause period and second means for periodically rotating said ball during a second double rotation wind period around a second axis while said ball is also simultaneously rotated by said first means around said first axis, a control system for timing and varying the duration of said first and second periods, said control system including a drive shaft and clutch means subdividing said shaft into first and second shaft portions, an apertured disc connected to and driven by said second shaft portion, a source of light and a photoelectric cell positioned respectively on opposite sides of said disc and in line with the apertured portion of said disc, said cell generating a first series of timing pulses in response to the rotation of said disc, serially connected first gate and first pulse counting means, with said first gate being connected to said cell to transmit said first series of pulses only during said second wind period to said first counting means, said first counting means generating a first control signal in response to a predetermined, selectable number of said first pulses; means to vary said number to vary the duration of said second wind period, a source of second timing pulses, serially connected second gate and second pulse counting means, with said second gate being connected to said source of second pulses, said second pulse counting means generating a second control signal in response to the receipt of a predetermined, selectable number of said second pulses during said first pause period, means to vary said number to vary the duration of said first pause period, and a common control circuit connected to the output side of said first and second counting means and controlled by said first and second control signals to time the duration, first, of said second wind period and then the duration of said first pause period.

3. An electronic control system for controlling the duration of first and second periods in an apparatus for winding a ball at a winding station, said control system including a motor, a shaft actuated by said motor, a first pulse generator connected to and operated by said motor, first means to make said first pulse generator to generate a first electrical pulse only at the end of said first period for terminating said first period and simultaneously begin said second period, a second pulse generator generating a second series of electrical pulses for timing the duration of said second period, a gate and a pulse counter connected to said second pulse generator for receiving and counting said second pulses through said gate only during said second period, and generating a control signal in response to a selectable number of said second pulses, means connected to said pulse counter for selecting and setting the duration of said second period, and a common control circuit connected to said first pulse generator and to the output side of said counter and controlled by said first pulse and said control signal, said control circuit starting and terminating said first and second periods in response to said first pulse and said control signal.

4. An electronic control system for controlling the duration of first and second periods in an apparatus for winding a ball at a winding station, said control system including a first pulse generator for generating first series of electrical pulses only during said first period for timing the duration of said first period, a first counter connected to said first pulse generator for counting said first pulses and generating a first control signal in response to a selectable number of said first pulses, said first counter having means to vary said number to vary the duration of said first period, a second pulse generator generating a second series of electrical pulses for timing the duration of said second period, a gate and a second pulse counter connected to said second pulse generator for receiving said second pulses through said gate only during said second period and generating a second control signal in response to a selectable number of said second pulses, said second counter having means to vary said number to vary the duration of said second period, and a common control circuit connected to said first and second counters and controlled by said first and second control signals, said control circuit starting and terminating said first and second periods in response to said first and second control signals.

5. A control system for a ball winding machine, said system alternately energizing first a brake winding during a first single rotation pause period and then energizing a clutch winding of an electrical clutch during a second double rotation wind period, said control system comprising a first source of constant frequency electrical timing pulses for timing the duration of said first pause period, counting means connected to said first source and having settable switches for varying the duration of said first pause period, means to vary the setting of said switches, said counting means producing a first control signal after receiving a predetermined number of said timing pulses, said predetermined number being determined by the settings of said switches during a given first pause period, an electronic circuit connected with its input side to the output side of said counting means and with its output side to said clutch and brake windings for energizing said clutch winding and de-energizing said brake winding immediately upon the receipt of said first control signal, thereby terminating said first pause period and simultaneously beginning said second wind period; a first constant speed motor for continuously rotating said ball around a first axis during said first and second periods, a second constant speed motor and mechanical means driven by said second motor, including said electrical clutch, for rotating said ball around a second axis only during said second wind period simultaneously with the rotation of said ball around said first axis during said first and second periods, said mechanical means including an apertured disc driven by said second motor, a source of light and a photo-electric cell producing a second control pulse when said light energizes said photo-electric cell through said apertured disc, said photo-electric cell being also connected to said electronic circuit, said electronic circuit energizing said brake winding and de-energizing said clutch winding with the aid of said second control pulse for starting said first pause period with the simultaneous termination of said second wind period.

6. The control system for a ball winding machine as defined in claim 5 in which said mechanical means driven by said second motor also includes first and second shafts driven by said second constant speed motor, said clutch mechanically interconnecting said first and second shafts when the winding of said clutch is energized, and means for driving said apertured disc by means of said second shaft, said first shaft being connected to and being continuously driven by said second motor, and said disc being stationary during the first pause period and being rotated by said second motor during the second wind period.

7. The control system for a ball winding machine as defined in claim 5 in which said disc includes a plurality of apertures non-uniformly spaced around the circumference of said disc.

8. The control system for a ball winding machine as defined in claim 5 which also includes a settable decimal counter between said photo-electric cell and said electronic circuit for adjusting the duration of said second wind period.

9. A control system for a cord winding machine for winding said cord on a spherical body by rotating said body solely around a first axis during a first single rotation pause period and around said first and a second axes during a second double rotation wind period, said system including serially connected a first pulse generator, generating first pulses, a first gate and a first counter to time the duration of said first period, said first counter having first means to generate a first control signal in response to a predetermined number of said first pulses, second means to vary the setting of said first means to vary the duration of said first period; serially connected second pulse generator generating second pulses, a second gate and a second counter to time the duration of said second wind period, said second counter having third means to generate a second control signal in response to a predetermined number of second pulses generated by said second pulse generator, fourth means to vary the setting of said third means to vary the duration of said second period; a control circuit connected to the output sides of said first and second counters and responsive to said first and second control signals, fifth means for producing the rotation of said spherical body around said second axis during said second wind period, a motor for actuating said fifth means; and sixth means connected to the output side of and operated by said control circuit to disconnect said motor from said fifth means during said first pause period, and to connect said motor to said fifth means during said second wind period in response to said control signals.

10. A control system for a ball winding machine comprising a first control channel including a first source of first electrical timing pulses and a first electronic counter for counting said first timing pulses and producing a first control signal in response to a predetermined number of said first timing pulses, a first set of settable switches included in said first counter, first means connected to the output of said first counter to receive said first control signal and be actuated by said first control signal, a mechanical connection between said first means and said first set of settable switches to alter the setting of said first set of switches in response to the actuation of said first means and thereby to alter the number of said first pulses required to actuate said first counter for producing said first control signal, a second control channel including a second source of second electrical timing pulses and a second electronic counter for counting said second timing pulses and producing a second control signal in response to a predetermined number of said second timing pulses, a second set of settable switches included in said second counter, a common control circuit connected to and controlled by said first and second control channels and said first and second control signals, a first motor continuously rotating said ball around a first axis, a second motor, second means coupled to and driven by said second motor for simultaneously and periodically rotating said ball around a second axis while said ball is continuously rotated about said first axis by said first motor, said second means including electrical clutch and brake means electrically connected to the output side of said common control circuit said common control circuit connecting and disconnecting said clutch and simultaneously releasing and applying said brake in response to said first and second control signals.

11. The control system as defined in claim 10 in which said first means is a stepping switch.

12. The control system as defined in claim 10 in which said first means is a motor.

13. The control system as defined in claim 10 in which said second control channel includes second means connected to the output of said second counter to receive said second control signal and be actuated by said second control signal, and a mechanical connection between said second means and said second set of settable switches to alter the setting of said second set of switches in reponse to the actuation of said second means and thereby to alter the number of said second pulses required to actuate said second counter for producing said second control signal.

14. The control system as defined in claim 13 in which said second means is a stepping switch.

15. The control system as defined in claim 13 in which said second means is a motor.

References Cited by the Examiner

UNITED STATES PATENTS

| | | | |
|---|---|---|---|
| 2,035,739 | 3/1936 | Cobb | 242—3 |
| 2,685,082 | 7/1954 | Beman et al. | 340—271 |
| 2,892,526 | 6/1959 | Devaud | 192—142 |
| 2,945,183 | 7/1960 | Hartke et al. | 328—48 |
| 2,975,338 | 3/1961 | Bivens et al. | 317—149 |
| 2,988,275 | 6/1961 | Thomason | 235—132 |
| 3,071,331 | 1/1963 | Holman | 242—3 |
| 3,101,179 | 8/1963 | Harris | 242—3 |

OTHER REFERENCES

Electronics "Predetermined Counters" (March 1947), pp. 120–123.

MERVIN STEIN, *Primary Examiner.*

RUSSELL C. MADER, *Examiner.*

UNITED STATES PATENT OFFICE
CERTIFICATE OF CORRECTION

Patent No. 3,224,690                        December 21, 1965

Rudolph G. Holman

It is hereby certified that error appears in the above numbered patent requiring correction and that the said Letters Patent should read as corrected below.

In the grant, line 3, after "California," insert -- assignor to W. J. Voit Rubber Corp., a corporation of California, --; line 12, for "Rudolph G. Holman, his heirs" read -- W. J. Voit Rubber Corp., its successors --; in the heading to the printed specification, lines 3 and 4, for "Rudolph G. Holman, 2301 Ponderosa, Apt. 8A, Santa Ana, Calif." read -- Rudolph G. Holman, Santa Ana, Calif., assignor to W. J. Voit Rubber Corp., a corporation of California --.

Signed and sealed this 3rd day of January 1967.

(SEAL)
Attest:

ERNEST W. SWIDER
Attesting Officer

EDWARD J. BRENNER
Commissioner of Patents